J. C. PACKARD.
STABILIZER FOR WAR AIRSHIPS.
APPLICATION FILED JULY 18, 1918.
1,365,188.
Patented Jan. 11, 1921.
3 SHEETS—SHEET 1.
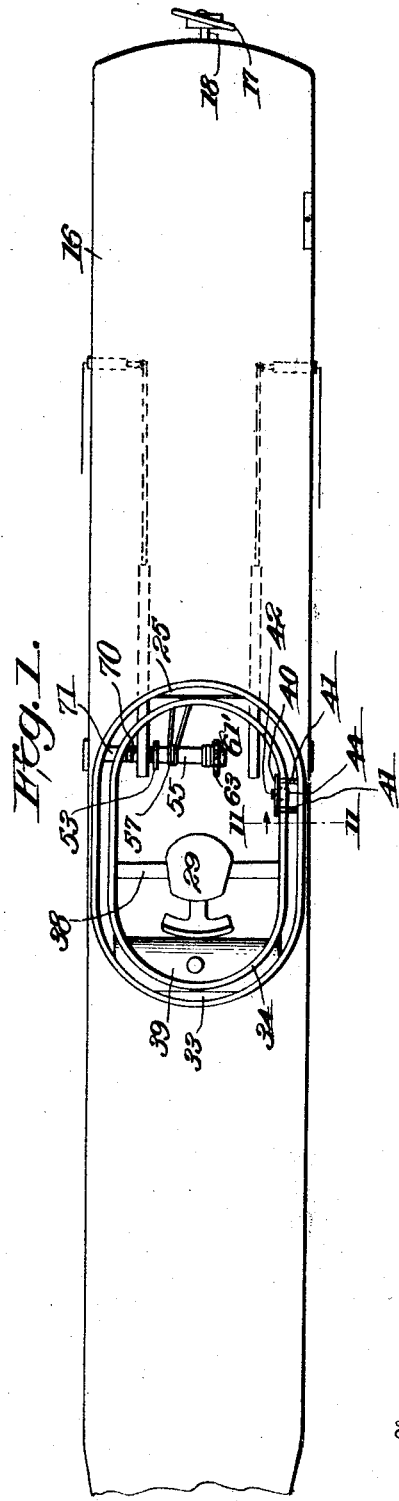
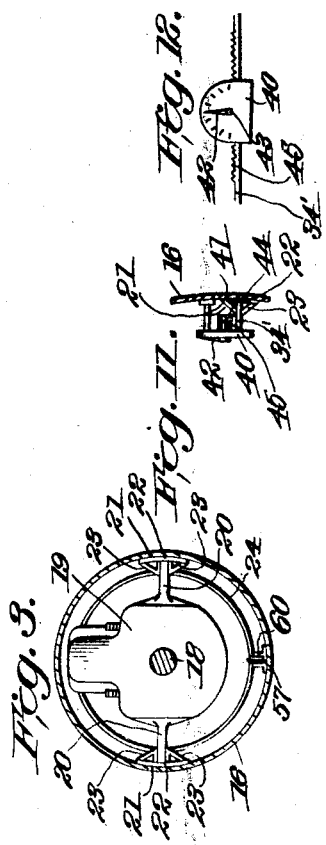
Inventor,
John C. Packard,
By
Attorney.

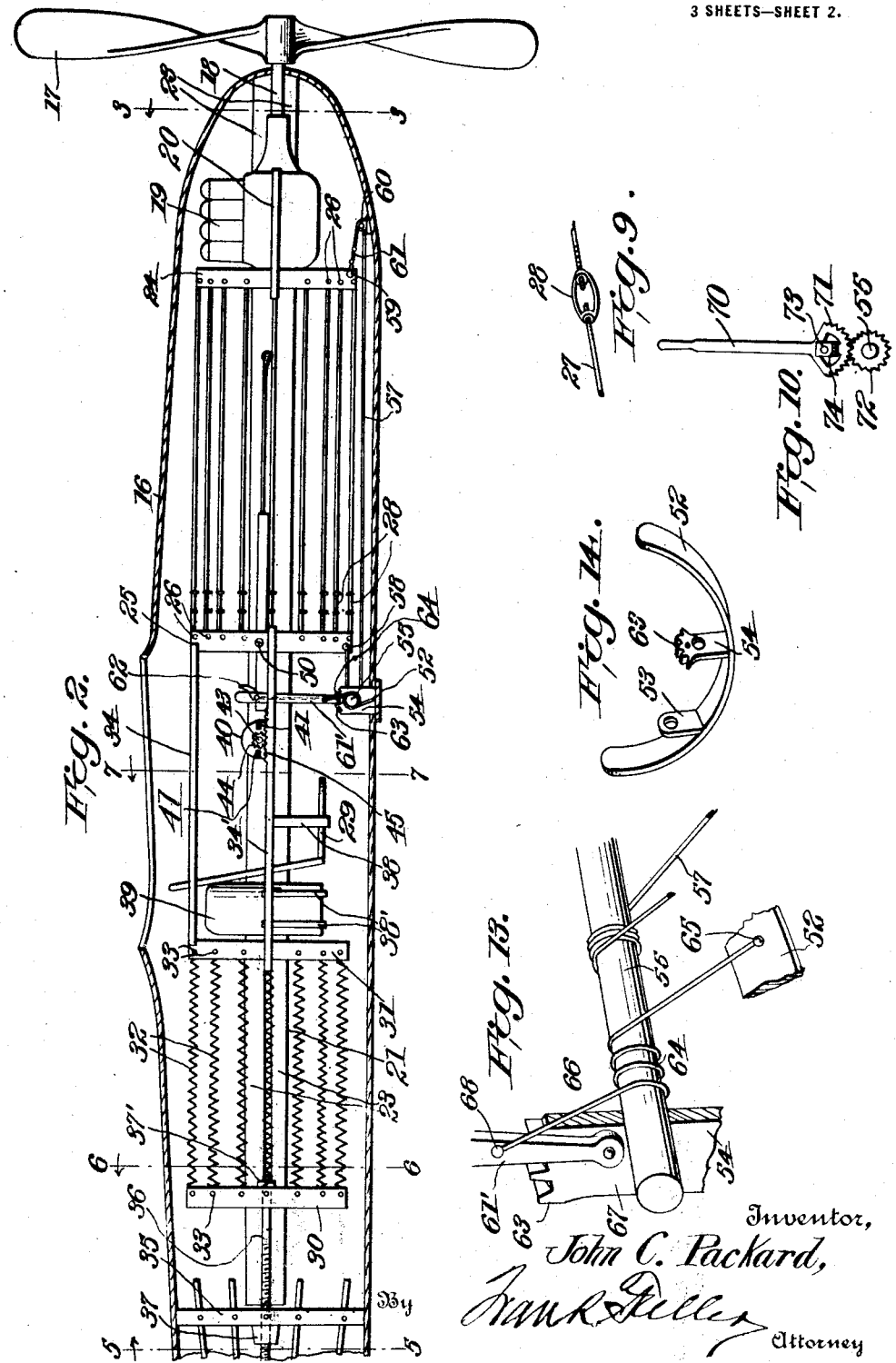

J. C. PACKARD.
STABILIZER FOR WAR AIRSHIPS.
APPLICATION FILED JULY 18, 1918.
1,365,188.
Patented Jan. 11, 1921.
3 SHEETS—SHEET 3.
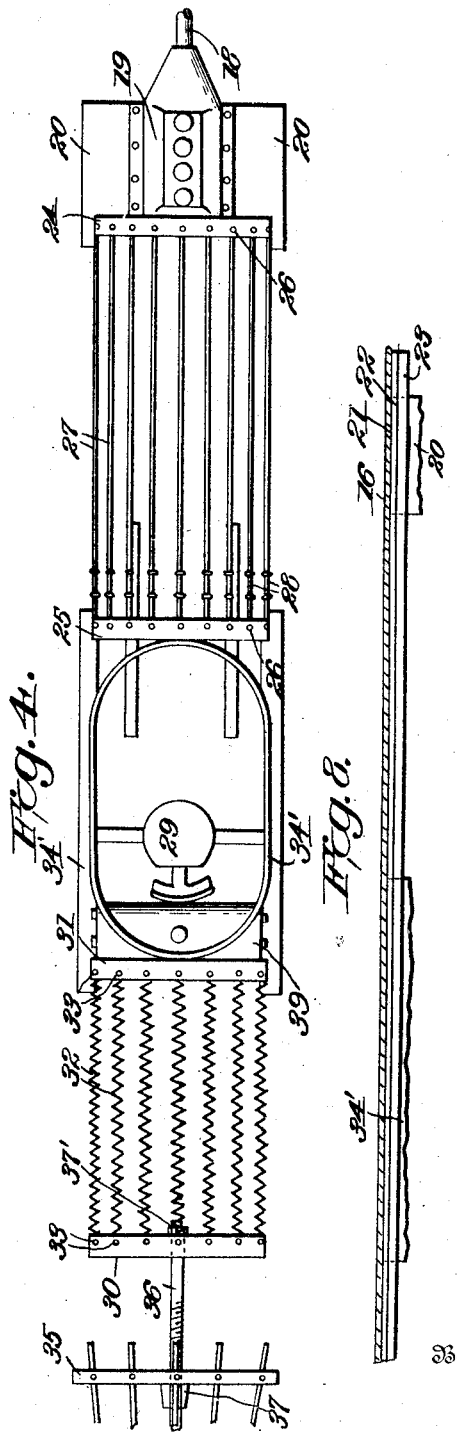
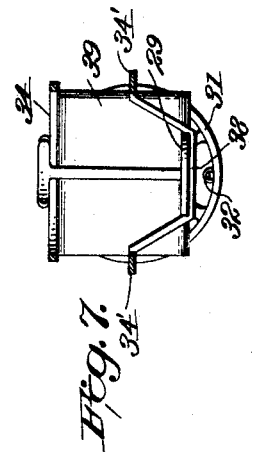
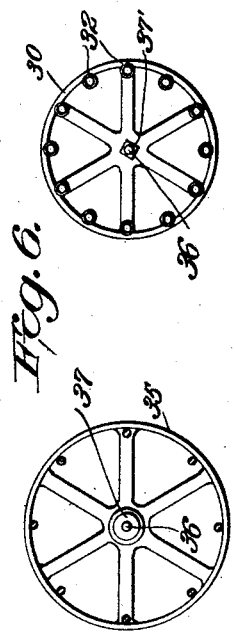
Inventor,
John C. Packard,
By
Attorney.

UNITED STATES PATENT OFFICE.

JOHN C. PACKARD, OF DENVER, COLORADO.

STABILIZER FOR WAR-AIRSHIPS.

1,365,188.     Specification of Letters Patent.     Patented Jan. 11, 1921.

Application filed July 18, 1918. Serial No. 245,511.

*To all whom it may concern:*

Be it known that JOHN C. PACKARD, a citizen of the United States, residing at Denver, in the county of Denver and State of Colorado, has invented certain new and useful Improvements in Stabilizers for War-Airships, of which the following is a specification.

My invention relates to an air ship having automatic stabilizing features of my pending application, Serial 237,496, filed May 31, 1918, embodied therein in improved form.

One particular object of the present improvement, is to provide an airship of this type adapted for war use and to this end having the sliding structure substantially in skeleton or open framework form.

Additional objects and advantages will become apparent as the invention is described hereinafter with relation to one of the preferred forms shown in the accompanying drawings, wherein:—Figure 1 is a plan view of the fuselage or carrying body; Fig. 2 is a vertical sectional view through the fuselage; Fig. 3 is a cross sectional view on the line 3—3 of Fig. 2; Fig. 4 is a top or plan view of the sliding body constituting my improvements; Fig. 5 is a cross sectional view on the line 5—5 of Fig. 2; Fig. 6 is a cross sectional view on the line 6—6 of Fig. 2; Fig. 7 is a cross sectional view on the line 7—7 of Fig. 2; Fig. 8 is a fragmentary plan view illustrating the mounting of one of the engine and seat supports; Fig. 9 is a fragmentary perspective view showing a turn buckle which may be used. Fig. 10 is an elevation of the emergency device to hold the load immovable; Fig. 11 is a cross sectional view on the line 11—11 of Fig. 1; Fig. 12 is a side elevation of the indicator shown in Fig. 11; Fig. 13 is a fragmentary perspective view of the manually operable means to prevent movement of the sliding body; and Fig. 14 is a detail perspective view of the bracket or bearing for mounting the parts of Fig. 13.

Referring specifically to the drawings, the planes and other parts of a flying machine have not been illustrated for the sake of clearness, since the invention is associated only with the fuselage or carrying body which is shown at 16 as of a hollow conventional form. The airship has its propeller 17 mounted on the main shaft 18 of a drive engine 19.

This improved form utilizes a sliding body or carriage to move the load according to changes in the position of the airship. To this end, the engine or prime mover 19 has lateral extensions 20 which slide longitudinally of the fuselage, supported in grooves in suitable guide devices, 21. These guide devices, by way of example, may comprise plates 22 rigidly secured to the fuselage and angle irons 23 rigidly secured to the plates and leaving grooves between them, as shown in Fig. 3. Rigidly fastened to the engine structure and extensions 20, is a round frame 24. Spaced from the frame 24 is a similar frame 25 and secured to these frames as by means of rivets or the like 26, are elongated wires or rods 27. In order that the tension of the rods or wires 27 may be varied, said rods or wires are provided in sections which screw into suitable turnbuckles 28, detailed in Fig. 9. The construction described is disposed just in front of the aviator's seat 29, while spaced round frames 30 and 31 are provided behind it, mounting strong coil springs 32 which are fastened thereto as at 33. Substantially oval frame 34 is rigidly connected to the frames 25 and 31, as shown in Figs. 2 and 4. Another frame 35, forming part of the fuselage, has a screw 36, which passes through and is secured to the frame 30. Beyond the frame 35, a nut 37 adjustably engages the thread screw or bolt 36. It will be realized that by the adjustment of the nut 37, the tension of springs 32 may be regulated. An additional tensioning nut 37' may engage threads of bolt 36 beyond the frame 30.

Bars or extensions 34' join the frames 25 and 31 which slide in the grooves of the guide devices 21 and support the sliding carriage.

The aviator's seat at 29 is supported by a bar or bracket 38 integral with or secured to the bars 34' while brackets 38' support a gasolene tank 39 containing the fuel supply for the motor 19, from bars 34' and in the rear of the seat 29.

At times the aviator will desire to know the position of the sliding structure relative to the fuselage. To this end an indicator as detailed in Figs. 11 and 12 and generally shown in Figs. 1 and 2, may be used. The dial of the indicator is designated 40, having suitable inch or other indications thereon. Brackets 41 rigidly mount the dial 40 from the fuselage 16.

An indicator 42 is fixed to one end of a spindle or short shaft 43, journaled in the dial while a pinion 44 is fixed to the other end of the shaft whose teeth mesh with teeth 45 provided on one of the bars 34'. Thus as the frame 34 slides, its motion will be imparted to the pinion which will turn the spindle 43 and indicator 42 relatively to the indications on the dial 40.

A bracket 52, preferably arcuate, is fastened to the exterior of the fuselage and has bearings 53 and 54 projecting therefrom interiorly of the fuselage as shown in Fig. 2. In the bearings 53 and 54, a shaft or drum 55 is mounted or journaled. Passing over the drum wrapped around it several times is a flexible cable 57, one end of which is fastened at 58 (Fig. 2) to the frame 25 while the other end is fastened at 59 to the frame 24. Said cable 57 may pass over a guide pulley device 60 and have a drum or turnbuckle 61 therein, to lengthen or shorten it. An operating lever 61' is pivoted to the bearing 54, having a manually operable lock device 62 (Fig. 2) to coöperate with a toothed segment 63 to hold the lever and drum against movement. A coil spring 64 is wrapped around the drum several times, having one end secured to the brackets 52 at 65 and the other end fastened as at 68 to the lever 61'.

An emergency lever 70 may be provided for the drum 55 and has a segment 71 meshing with the teeth of a pinion 72 on the drum 55. This lever is pivoted as shown at 73 to the bracket 74 carried by the fuselage.

In the operation of the apparatus, the lever 61' is released and is rendered free to swing upon its pivot. The entire inner frame or structure, including the engine and associated elements, may now move longitudinally of the fuselage. When the forward end of the machine is directed downwardly, it is obvious that the inner structure or frame will move downwardly and forwardly, thereby shifting an increased weight toward the forward end of the machine, which serves to depress such forward end. This forward movement is opposed by the springs 32. When the forward end of the machine is inclined upwardly, the frame moves rearwardly, aided by the action of the springs 32. This shifts the weight toward the rear end of the fuselage and hence aids in elevating the machine.

I claim—

1. In a flying machine, a fuselage, longitudinal guide means arranged within the fuselage, a frame having elements slidable within the guide means and adapted to be shifted longitudinally of the fuselage, springs connected with the frame to oppose its longitudinal movement in one direction, a pivoted lever arranged near the frame, means connecting the lever and frame, and means adapted to lock the lever against swinging movement.

2. In a flying machine, a fuselage, longitudinal guide means arranged within the fuselage, a frame having elements slidable within the guide means and adapted to be shifted longitudinally of the fuselage, a motor secured to the forward end of the frame, a plurality of retractile coil springs secured to the rear end of the frame to oppose its longitudinal movement in a forwardly direction, a rotatable element, a flexible element connected with the opposite ends of the frame and engaging the rotatable element, a lever to move the rotatable element, and means to lock the lever against movement.

3. A flying machine comprising a fuselage, a motor slidably mounted therein, a frame structure rigidly connected with the motor and sliding with the same, resilient means yieldably retaining the frame structure and motor against sliding movement in one direction, a driver's seat carried by said frame structure, and means for releasably holding the frame structure and motor against sliding movement.

In testimony whereof I affix my signature in the presence of two witnesses.

JOHN C. PACKARD.

Witnesses:
 GARNET DOTY,
 EMMA L. HARLOW.